Feb. 5, 1952     C. T. KOOCHEMBERE     2,584,133
INSERT FASTENER
Filed March 26, 1945
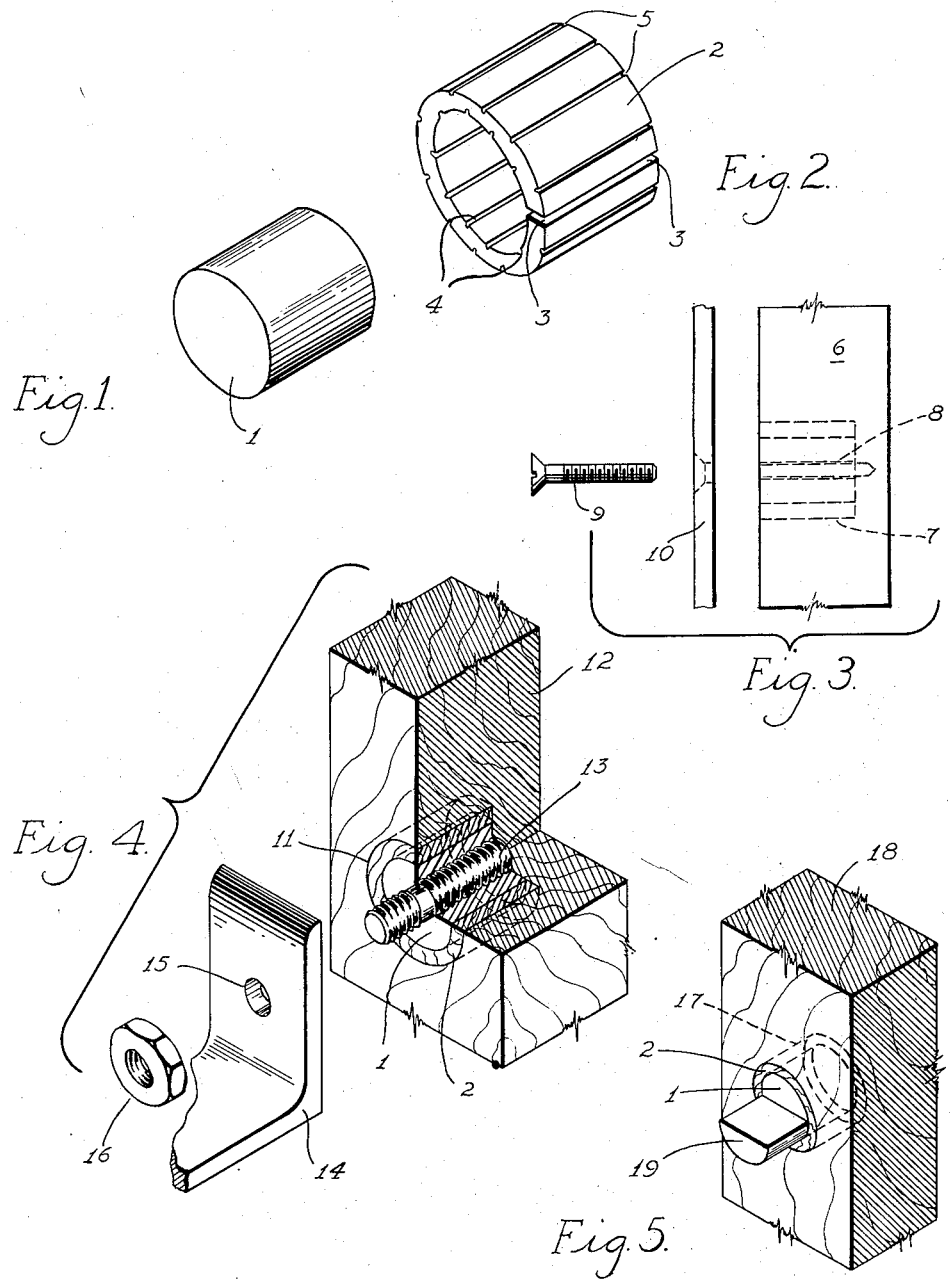
INVENTOR.
CHRIS T. KOOCHEMBERE
BY
Ralph L Chappell
ATTORNEY.

Patented Feb. 5, 1952

2,584,133

UNITED STATES PATENT OFFICE 2,584,133

INSERT FASTENER

Chris T. Koochembere, Aldan, Pa.

Application March 26, 1945, Serial No. 584,995

5 Claims. (Cl. 20—92)

(Granted under the act of March 3, 1883, as amended April 30, 1928; 370 O. G. 757)

This invention relates to new and useful improvements in fastening devices, and more particularly to insert devices for use in securing together two or more structural elements.

In the assembly and securing together of metal or wood members to a wood member, conventional wood type screws in many cases do not provide sufficient tension and shear strength to render their use feasible or practical. This is particularly true in the aircraft and other industries where the joint or connection between two members may be subjected to substantial stresses and strains. Accordingly, in such instances, it has become the practice to provide metal inserts of various types that may be secured in the wood structural member and tapped to receive a metal screw element employed to secure to such wood structural member another wood or metal member, or fitting. Prior to the present invention, however, known insert devices for this purpose have been characterized by their relatively complicated construction, and the necessity for having on hand a special set of tools and equipment for inserting or installing them. Furthermore, such prior insert devices are comparatively expensive and require a substantial amount of time to install.

An object of the present invention is to provide a novel insert device for the purposes described that is characterized by a high degree of strength and holding properties, yet is of comparatively simplified construction and relatively inexpensive to manufacture.

Another object is to provide a novel insert connection of the stated character that may be readily and easily fabricated and assemblied from standard stock items, and even from scrap materials, without the use of special machinery.

Another object is to provide a novel insert connection as described that requires no special tools or equipment for its application or installation.

A further object is to provide a novel insert connector having the described characteristics, which may be installed and applied readily and quickly.

Still a further object is to provide a novel insert connector of the stated type that is capable of withstanding substantial stresses and strains, and which is otherwise efficient in use.

These and other objects of the invention, and the various features and details of the construction and use thereof, are hereinafter fully set forth and described with reference to the accompanying drawing, in which:

Fig. 1 is a view in perspective of one member of a composite insert made according to the present invention.

Fig. 2 is a view in perspective of the other member of the composite insert.

Fig. 3 is a separated view in elevation illustrating a typical application of the present invention.

Fig. 4 is a separated view in perspective of another application of the insert of the present invention, and Fig. 5 is a view in perspective of still another application of the invention.

As shown in Figs. 1 and 2, an insert made according to the present invention comprises essentially an inner cylindrical core member 1 of predetermined diameter and length, and an outer tubular collar or sleeve member 2 that is arranged to embrace, and be securely bonded to, said inner member 1, the said member 2 having an internal diameter and length substantially equal, respectively, to the outer diameter and length of the inner member or core 1. The inner cylindrical core member 1 is composed of a suitable metal such as, for example, aluminum or other metal or alloy that is preferably comparatively light in weight and readily tapped or otherwise machined as desired.

On the other hand, the outer sleeve or collar 2 is composed of a suitable material such as wood, for example, birch, mahogany, maple, ply-wood, or any other wood or like material that is relatively strong, pliant and characterized by its good glue adhering properties. As shown in Fig. 2 of the drawing, the collar or sleeve member 2 is split longitudinally as indicated at 3 and, in addition, is provided both internally and externally with a plurality of longitudinal scores or grooves 4 and 5, respectively, formed therein at substantially equally spaced intervals circumferentially thereof, it being noted that the internal scores or grooves 4 are staggered with respect to the external scores 5 as illustrated.

As previously stated, the sleeve or collar member 2 is securely bonded to the cylindrical metal core member 1, and this may be accomplished effectively, with the use of appropriate adhesive materials, by either the so-called single or two-step methods, the single-step method utilizing a single adhesive and the two-step method utilizing a primary adhesive to provide a surface on the core 1 to which a secondary adhesive will adhere to provide the desired bond between the core 1 and the surrounding sleeve or collar member 2.

There are adhesives or cements on the market satisfactory in the single-step process to bond the sleeve or collar 2 to the inner or core member 1. One such adhesive is a thermosetting phenolic resin containing a rubber ingredient. A second such cement is non-rubber-containing, heat setting and comprises a liquid thermosetting resin, partly miscible with water and completely alcohol soluble, and a powdered catalyst.

In fabricating the composite insert of the present invention with the use of a cement of the first above-mentioned type in the single-step process, the surface of the metal member 1 is first cleaned and conditioned, and the contact surfaces of both the core 1 and sleeve 2 are coated with the cement to provide on each thereof a film when dried of about 0.001 inch. The coated surfaces are then air-dried and pre-cured at a temperature dependent upon the prevailing relative humidity, after which the members 1 and 2 are assemblied in the described relation with the sleeve 2 clamped tightly upon the core member 1. The assembled insert is then placed under pressure, and cured for about 15 to 20 minutes at from about 325° F. to 335° F. The pressure employed, of course, cannot exceed the crushing strength of the wood sleeve 2, and may vary from about 100 p. s. i. for spruce to about 250 p. s. i. for maple. At the termination of the curing time the composite insert is ready for use.

In fabricating the composite insert using a cement of the second above-mentioned type in the single-step process, the surface of the metal inner member is first cleaned and conditioned as specified by the manufacturer of the cement, and the liquid resin component is then spread over the contact surfaces of both the core 1 and sleeve or collar 2. The powdered catalyst component is then sprinkled over the resin-coated surfaces of the members 1 and 2, and they are then assembled, clamped tightly together and cured under heat and pressure. The cure is carried out for about 15 minutes at a temperature of about 300° F., and a pressure of from about 50 p. s. i. to 300 p. s. i., depending upon the crushing strength of the wood sleeve 2. At the end of the cure, the insert may be removed without cooling, and is then ready for use.

While satisfactory results are obtained by the use of single-step processes for bonding the sleeve or collar 2 to the inner or core member 1, I prefer to employ the two-step method to bond the members 1 and 2 together, using a suitable room-setting secondary cement, so as to eliminate the necessity for subjecting the wood sleeve or collar member 2 to the high curing temperatures required in the single step process. According to the two-step process, the metal core 1 is first cleaned and then conditioned by applying on its cylindrical surface a coating of a suitable primary cement or lacquer having good adhering properties to metal and capable of providing on the metal core a surface having good adhering properties to a secondary cement that is characterized by its good adhering properties to wood. The primary cement coating is suitably cured, and the contact surfaces of the members 1 and 2 are then coated with the secondary cement, after which said members are assembled and tightly clamped together until the secondary cement has thoroughly set to substantially permanent bond the outer collar or sleeve 2 to the inner cylindrical core 1, the internal scores or grooves 4 in the sleeve or collar 2 functioning to provide substantially greater surface contact between the wood member 2 and the secondary cement coating as well as a more efficient interlock or connection between the members 1 and 2.

A rubber-vinyl composition is satisfactory as a primary cement thinned to a workable consistency. After the cylindrical member 1 is coated as aforesaid with this primary cement, the coated member is air-dried for about one hour at room temperature and then cured for about fifteen minutes at a temperature of approximately 300° F.

A room-setting phenolic resin usually mixed with a catalyst is a suitable secondary cement. A satisfactory set of this secondary cement to substantially permanently bond the inner and outer members 1 and 2 together is obtained under a clamp pressure of approximately one-hundred pounds per square inch for a period of about eight hours at 75° F.

The composite insert, comprising the inner metal member 1 and outer wood sleeve or collar 2, substantially permanently bonded together as hereinbefore described, is adapted to be securely bonded in a structural member of wood to which it may be desired to secure another wood or metal member, or to which it may be desired to attach a fitting or other piece of equipment.

Several such applications of the insert are illustrated in the drawing, and as shown in Fig. 3 thereof, a structural member 6 of wood may be provided with a cylindrical recess or socket 7 having a depth the same as the axial length of the composite insert and a diameter substantially equal to the external diameter of the insert sleeve or collar 2 so as snugly to receive the insert therein. The contact surfaces of the composite insert and the wood member 6 may be coated with a suitable cement or glue having good wood to wood adhering properties, after which the coated insert is tapped lightly into the recess or socket 7 in the structural member 6. The grooves or scores 5 in the external surface of the sleeve 2 of the insert provide a relatively large surface contact between the sleeve 2 and the cement, and provide also an effective interlock or connection between the structural member 6 and the insert. With the insert secured in the recess or socket 7 in the structural member 6 as described, the cement is allowed to set and the metal core 1 of the insert, for example, may be drilled and tapped as indicated at 8 to receive a screw 9 that may be employed to attach to the member 6 another member 10 of metal, wood or suitable composition material.

The cement employed to bond the composite insert in the structural member 6 can be of either the thermo-setting or room-setting type having good wood to wood adhering properties. However, due to the limitations existing in many cases that make impractical the application of heat and pressure to the structural member 6 and the insert required in the case of thermosetting cements, I prefer to use a cement of the room-setting type.

In Fig. 4 of the drawing, another application of the invention is illustrated, wherein the composite insert is secured in a socket or recess 11 formed in a wood structural member 12 in the manner previously described with reference to Fig. 3 of the drawing. In this particular instance, however, the metal core 1 of the composite insert is drilled and tapped to receive a threaded stud 13 to which it may be desired to attach an angle bracket or other fitting 14 having an opening 15 therein through which the projecting portion of the threaded stud 13 is received, the said fitting 14 being secured on the stud 13 by means of a nut or like retaining element 16.

Still another application is shown in Fig. 5 of the drawing wherein the composite insert is secured as previously described in a recess or socket 17 formed in a wood structural member 18. In this illustrated application of the invention the metal core 1 of the composite insert is provided, for example, with an integral semi-circular projecting portion 19 on which may be mounted and secured, for example, by means of a lock washer or lock nut, a suitable fitting, connection or the like (not shown).

By providing a sleeve member 2 as described herein that is longitudinally split as indicated at 3, sufficient clearance or space is provided circumferentially of the sleeve to permit it to be clamped tightly about the core 1 under pressure during bonding of the sleeve and core together to form the composite insert and, as previously stated, the provision of the internal and external scores or grooves 4 and 5, respectively, in the sleeve 2 affords substantially greater surface contact between the sleeve 2 and the inner and outer adhesive coatings, as well as providing a more efficient interlock or connection between the insert core and sleeve, and between the latter and the member in which the insert can be inserted.

From the foregoing it will be observed that the present invention provides a novel composite insert or connector that is characterized by its substantial strength and holding properties and which is capable of withstanding substantial stresses and strains under load conditions. The invention provides also a novel composite insert for the purposes described that is of comparatively simplified construction relatively inexpensive to manufacture, and which can be installed and applied readily and quickly without the use of special tools or equipment. Furthermore the present invention embodies such construction and arrangement of parts that enables it to be readily and easily fabricated and assembled from standard stock items and even from scrap materials without the use of special machinery.

While certain embodiments and applications of the present invention have been illustrated and described herein, is not intended that the invention be limited thereto, and changes and modifications can be made and incorporated within the scope of the claims.

The invention described herein may be manufactured and used by or for the Government of the United States of America for governmental purposes without the payment of any royalties thereon or therefor.

I claim:

1. The structure of a composite insert for metal screw-threaded attachment to a member of material with good properties for adhering and less shear strength than metal, the structure consisting of an elongated metal core comprising an exterior surface with sufficient area for a strong adhesive bond, a sleeve of material with properties for good bonding by means of adhesive, the sleeve comprising its interior surface contoured and extended both peripherally and lengthwise to correspond with and fit the exterior surface of the core, the sleeve being bonded by adhesive to the metal core with the corresponding respective interior and exterior surfaces of the sleeve and core pressed together, the exterior surface of the sleeve being contoured to fit into a companion socket of the member for glue-bonded engagement therewith, the interior and exterior surfaces of the sleeve comprising lengthwise grooves arranged at intervals peripherally, the grooves of the respective interior and exterior surfaces of the sleeve being arranged in staggered relationship to each other.

2. A composite insert of the character described, comprising a cylindrical metal core member of predetermined diameter and length, a longitudinally split wood sleeve member embracing the cylindrical surface of said core member, said sleeve member having its interior and exterior surfaces provided with longitudinal grooves spaced at substantially equal intervals thereabout with the grooves in the interior surface thereof staggered with respect to the grooves in the exterior surface, and means intermediate the core and sleeve members securely bonding said members together.

3. In the method of making a composite insert of the character described, the steps comprising conditioning the exterior cylindrical surface of a cylindrical metal core member, longitudinally scoring the interior and exterior surfaces of a split sleeve member at substantially equally spaced intervals thereabout, applying to said conditioned surface of the core member a coating of adhesive having good adhering properties thereto and to wood, positioning said longitudinally split wood sleeve member on the adhesive coated metal core, clamping said split sleeve member tightly upon said core member under substantial pressure, and causing the adhesive between the core and sleeve members to set to securely bond said members together.

4. In the method of making a composite insert of the character described having an inner metal core member and an outer longitudinally split wood sleeve member, the steps comprising conditioning the exterior cylindrical surface of the core member, longitudinally scoring the interior and exterior surfaces of the split sleeve member at substantially equally spaced intervals thereabout with the internal scores staggered with respect to the external scores, applying to said conditioned surface of the core member a coating of adhesive having good adhering properties to said conditioned core surface and to wood, applying a coating of said adhesive to the inner surface of said split wood sleeve, positioning the split wood sleeve upon the core member with the adhesive coated surface of the sleeve in contact with the adhesive coated surface of the core, clamping said split sleeve tightly upon said core under substantial pressure, and causing the adhesive between the core and sleeve to set to securely bond said members together.

5. The structure of a composite insert for screw-threaded attachment to a member of material with good properties for adhering and less shear strength than metal, the structure consisting of a metal core adapted to receive screw-threading for the attachment and having a cylindrical outer surface of predetermined length, a sleeve of material with properties of good bonding by means of adhesive and of a length to correspond with the length of the core, the wall thereof being split lengthwise throughout its length, the sleeve comprising an inner surface with a cylindrical contour of a size to fit the outer surface of the core, the inner surface of the sleeve and the outer surface of the core being securely bonded together to comprise the composite structure, the exterior surface of the sleeve being contoured to fit a companion socket of the member for glue-bonded engagement therewith, the interior and exterior surfaces of the sleeve being provided each with a set of longitudinal grooves, the grooves of each set being spaced apart at substantially equal intervals circumferentially, and the grooves of the different sets being staggered with reference to each other.

CHRIS T. KOOCHEMBERE.

REFERENCES CITED

The following references are of record in the file of this patent:

UNITED STATES PATENTS

| Number | Name | Date |
|---|---|---|
| 330,630 | Smith | Nov. 17, 1885 |
| 575,089 | Yaeger | Jan. 12, 1897 |
| 713,334 | Niehaus | Nov. 11, 1902 |
| 792,001 | Callan | June 13, 1905 |
| 803,161 | Hastings | Oct. 13, 1905 |
| 1,795,821 | Baldwin | Mar. 10, 1931 |
| 1,963,301 | Gloystein | June 16, 1934 |
| 2,069,552 | Mikulasek | Feb. 2, 1937 |
| 2,073,528 | Safford | Mar. 9, 1937 |
| 2,117,085 | Ensminger | May 10, 1938 |
| 2,226,589 | Smyers | Dec. 31, 1940 |
| 2,241,684 | Ware | May 5, 1941 |
| 2,263,198 | Valiton | Nov. 18, 1941 |
| 2,324,083 | Holmes | July 13, 1943 |
| 2,379,006 | Johnson | June 26, 1945 |
| 2,411,542 | Ilch | Nov. 26, 1946 |

FOREIGN PATENTS

| Number | Country | Date |
|---|---|---|
| 22,233 | Great Britain | Dec. 5, 1892 |
| 406,083 | Great Britain | Feb. 22, 1934 |
| 406,126 | Great Britain | Feb. 22, 1934 |
| 442,832 | Great Britain | Feb. 17, 1936 |
| 474,236 | Great Britain | Oct. 27, 1937 |